United States Patent [19]

Scholze et al.

[11] 4,374,933

[45] Feb. 22, 1983

[54] METHOD OF PREPARATION OF POROUS MEMBRANES AND ADSORBENTS

[75] Inventors: Horst Scholze, Würzburg; Helmut Schmidt, Höchberg; Harald Böttner, Gerbrunn, all of Fed. Rep. of Germany

[73] Assignee: Fraunhofer-Gesellschaft, Munich, Fed. Rep. of Germany

[21] Appl. No.: 360,996

[22] Filed: Mar. 23, 1982

Related U.S. Application Data

[63] Continuation of Ser. No. 160,480, Jun. 18, 1980, abandoned.

[30] Foreign Application Priority Data

Jun. 27, 1979 [DE] Fed. Rep. of Germany ....... 2925969

[51] Int. Cl.$^3$ .................... C08J 9/24; C08G 77/56
[52] U.S. Cl. .................... 521/64; 210/500.2;
521/154; 528/5; 528/8; 528/9; 528/10; 528/12;
528/14; 528/16; 528/17; 528/18; 528/20;
528/21; 528/23; 528/25; 528/29; 528/31;
528/32; 528/38; 528/39; 528/41
[58] Field of Search ............. 521/154, 64; 528/5,
528/8, 9, 10, 12, 14, 16, 17, 18, 20, 21, 23, 25,
29, 31, 38, 39, 32, 41, 42, 43; 210/500.2

[56] References Cited

U.S. PATENT DOCUMENTS 4,238,590 12/1980 Scholze .................................. 528/5

Primary Examiner—Morton Foelak
Attorney, Agent, or Firm—Birch, Stewart, Kolasch & Birch

[57] ABSTRACT

Silicic acid heteropolycondensates made from hydrolyzable silicic acid derivatives and substituted silanes, optionally with either or both of one or more functional silanes and non-volatile metal oxides or their precursors are made by a known technique, in which the reaction mixture is hydrolyzed and condensed by the action of water and a condensation catalyst, the latter being employed in an amount up to 3% by weight, based upon the weight of the reaction mixture. Improved heteropolycondensates usable as adsorbents and porous membranes can be made by using greater amounts of catalyst, ranging up to 75% by weight, based upon the weight of the reaction mixture. These improved products are very stable in use and are characterized by a pore structure which includes fine pores and coarse pores, whereby products in the form of membranes can have an asymmetrical structure, if desired.

22 Claims, No Drawings

METHOD OF PREPARATION OF POROUS MEMBRANES AND ADSORBENTS

This application is a continuation, copending application Ser. No. 160,480, filed on June 18, 1980 now abandoned.

BACKGROUND OF THE INVENTION

The most varied membrane materials and adsorbents are known for separating mixtures of materials and are continually being improved with respect to their technical suitability and economy. In the treatment of effluent waters, it is desirable for instance by developing asymmetrical membranes to achieve the throughput loadings necessary for technical application. On the other hand, other problems arise in other areas of use. For example, known membrane materials, such as cellulose acetate membranes, are not very temperature or pressure resistant and swell rapidly in organic solvents. The low temperature, pressure and solvent resistance has the result that the pore sizes continually alter during technical application and this can lead to non-reproducible results as well as short periods of use for the membranes.

Also, adsorbents for purifying fluid or gaseous media are known in enormous numbers, for example, active charcoal and oxides with high specific surfaces, such as aluminium oxide. With these known adsorbents, adsorption normally takes place non-specifically and not very selectively. Moreover, the adsorption process is often only poorly reversible at high adsorption grades, that is, a high consumption of energy is necessary for desorption.

Known adsorbents and membranes with surfaces which have been chemically modified also have the disadvantage that, as a rule, they have only a modified mono-layer at the surface, so that they are extraordinarily sensitive to mechanical and chemical effects, such as hydrolytic action.

The inventors have already developed certain silicic acid heteropolycondensates, which are particularly suitable for the preparation of temperature, pressure and solvent-resistant membranes for the most varied separation problems. In the granular or similar state, these polycondensates are usable as adsorbents, even for highly specific separations, which either cannot be carried out or only with unsatisfactory results with known adsorption agents.

These porous silicic acid heteropolycondensates usable as membranes and adsorbents are made by:
(i) forming a reaction mixture comprising:
(a) at least one hydrolysable silicic acid derivative of the general formula I:

$$SiR_4 \qquad (I)$$

wherein each R is selected from the group consisting of hydrogen, halogen, alkoxy and $-NR'_2$ radicals, wherein each R' in the last-mentioned radical independently represents a hydrogen atom or an alkyl group, with the proviso that not all the R radicals are hydrogen atoms, and
(b) at least one substituted silane of the general formula II:

$$SiR_nR''_{(4-n)} \qquad (II)$$

wherein R has the meaning defined above, each R'' is selected from the group consisting of alkyl, alkenyl, aryl and aralkyl radicals and n is an integer from 1 to 3, and
(c) optionally at least one functional silane of the general formula III:

$$SiR_n(R'''Y)_{(4-n)} \qquad (III)$$

wherein R and n have the meanings defined above, each R''' is selected from the group consisting of alkylene, phenylene, alkylphenylene and alkylenephenylene radicals and Y is selected from the group consisting of halogen, amino, anilino, aldehyde, keto, carboxy, hydroxy, mercapto, cyano, hydroxyphenyl, diazo, carboxylic alkyl ester, sulphonic acid ($-SO_3H$) and phosphoric acid ($-PO_3H_2$) radicals, and/or
(d) optionally at least one oxide component selected from the group consisting of non-volatile oxides soluble in the reaction medium and compounds capable of forming non-volatile oxides soluble in the reaction medium, the oxide component being an oxide of an element selected from Groups Ia to Va, Group IVb and Group Vb of the Periodic System, and
(ii) subjecting the reaction mixture to hydrolysis and condensation in the presence of at least the amount of water stoichiometrically required for hydrolysis, optionally a solvent and in the presence of a condensation catalyst, wherein the amounts of the components (a) to (d) are selected so that the resultant silicic acid heteropolycondensate, calculated as oxide units, contains, by weight, 35% to 90% of component (a), 10% to 50% of component (b), 0% to 15% of component (c) and 0% to 40% of component (d).

In this method, the condensation catalyst is used in an amount of not more than 3% by weight, based on the weight of the reaction mixture.

SUMMARY OF THE INVENTION

It has now been found that by using higher catalyst concentrations, in the region of up to 75% by weight based on the weight of the reaction mixture, porous silicic acid heteropolycondensates are produced which are characterised by a specific structure. Two definite different pore sizes occur side by side, namely on the one hand, pores with an average diameter in the nanometer range (approximately 0.5 to 10 nm) and on the other hand pores with an average diameter in the micrometer range (approximately 0.1 to 10 μm).

The smaller pores, which are responsible for the high specific surface of up to 1200 m²/g, particularly 200 to 500 m²/g, are found in the spherical "primary particles" of the polycondensate, which are interconnected so as to form a three-dimensional structure. Between the individual primary particles or their aggregates, "channels" are formed which represent the larger pores with diameters in the micrometer range.

The structural properties of the silicic acid heteropolycondensates made with higher catalyst concentrations make them particularly suitable for use as adsorbents.

Whereas the small pores with their large surface area provide a high adsorption capacity, the large pores have a rapid material transport characteristic as a result, that is a very rapid adsorption and desorption. In contrast to silicic acid heteropolycondensates with homogeneous pore structures, which have been made corresponding to the earlier discovery in a single condensation stage with a lower catalyst concentration, with the same composition and similar specific surface, an adsorption and desorption kinetic which is faster by a factor of 3 has been measured.

DESCRIPTION OF THE PREFERRED EMBODIMENTS

Preferred silicic acid heteropolycondensates according to the invention usable as membranes and adsorbents contain, calculated as oxides, by weight, 50% to 80% and preferably 60% to 70% of component (a), 20% to 40% and preferably 30% to 35% of component (b), 0% to 10% and preferably 0% to 8% of component (c) and 0% to 20% and preferably 0% to 10% of component (d).

If either or both of components (c) and (d) is/are used, the minimum amount preferably constitutes 1% and more preferably 5% by weight.

The aforementioned quantities relate to the composition of the silicic acid heteropolycondensates as oxide units, that is components (a) to (d) are introduced in amounts such that the oxide units arising through hydrolysis and condensation or the oxide equivalents produced by hydrolysis yield the given proportion by weight (percent by weight) of the final condensate. The quantity of hydrolysable silanes of the formula $R_nSi(OR)_{4-n}$ is calculated e.g. on the basis of oxide units of the formula $R_nSiO_{(4-n)/2}$, whereas for example for metal alcoholates (d) of the formula MOR, the oxide equivalent $M_2O$ is taken as the basis.

The ratio of the quantities of the starting components (a) to (d), together with the condensation conditions employed, determines the properties of the resultant membranes and adsorbents. It has been found that the hydrolysable silicic acid derivatives of formula I are mainly responsible for the specific surface and porosity of the polycondensates, the substituted silanes of formula II for the mechanical strength (that is, the internal consistency), the functional silanes of formula III for the number of reactive coupling sites and the oxide components (d) for the mechanical properties of the membranes and adsorbents. It is of critical importance here that the hydrolysable silicic acid derivatives of formula I are used in an amount of more than 30% by weight, in order to ensure the requisite porosity.

The components (a) and (b) are interchangeable insofar as for example, instead of a mixture of an orthosilicic acid ester (a) and a dialkylsilane (b), an equivalent amount of a corresponding monoalkylsilane e.g. $(CH_3)Si(OC_2H_5)_3$ or $(CH_3)SiCl_3$, can be used.

In the definition of the starting compounds of the formulae I to III, the several radicals or groups R,R',R", R'" and Y can have the same or different meanings.

The alkyl radicals are, in general, for example, straight-chain or branched radicals with 1 to 20 and preferably 1 to 10 carbon atoms, particularly lower alkyl ($C_{1-6}$) radicals. Special examples are methyl, ethyl, n-propyl, isopropyl, n-butyl, sec.butyl, tert.-butyl, pentyl and n-hexyl.

The aryl groups preferably contain, e.g., 6 to 25 and most preferably 6 to 14 and, most desirably 6 to 10, carbon atoms. Special examples are phenyl and naphthyl, phenyl being the most preferred.

The alkenyl radicals are, for example, straight-chain or branched groups with 2 to 20 and preferably 2 to 10 carbon atoms, particularly lower alkenyl ($C_{2-6}$) radicals. Special examples are vinyl and allyl.

The alkylene, alkoxy, alkylamino and aralkyl radicals are basically derived from the aforementioned alkyl and aryl radicals. Special examples are ethylene, trimethylene, methoxy, ethoxy, n- and i-propoxy, n-, sec. and tert.-butoxy, monoethylamino, dimethylamino, diethylamino, benzyl and tolyl.

The expression "lower" relates to groups with 1 to 6, preferably 1 to 4 and most preferably 1 to 2, carbon atoms.

The stated groups can if required carry the usual substituents, e.g. halogen atoms, lower alkyl, hydroxy, nitro or amino groups.

As regards halogens, fluorine, chlorine and bromine are preferred, chlorine being particularly preferred.

In component (c), n preferably has the value 2 or 3 and most particularly the value 3.

Examples of suitable starting silanes of formula I are $(CH_3O)_4Si$, $(C_2H_5O)_4Si$, $SiCl_4$ and $HSiCl_3$.

Examples of suitable starting silanes of formula II are $(CH_3)_2SiCl_2$, $(CH_3)_2Si(OCH_3)_2$, $(CH_3)_2Si(OC_2H_5)_2$ and $(C_6H_5)_2SiCl_2$.

Examples of suitable starting silanes of formula III are $(C_2H_5O)_3Si(CH_2)_3NH_2$ and $(C_2H_5O)Si(CH_2)_3CN$.

These silanes can be made by known methods; cf W. Noll, "Chemie und Technologie der Silicone", Verlag Chemie GmbH, Weinheim/Bergstrasse (1968).

As the starting component (d), non-volatile oxides or compounds forming non-volatile oxides which are soluble in the reaction medium of elements of Groups Ia to Va, IVb or Vb of the Periodic System are used. These compounds react with the other components (a) to (c) and thus produce a modification of the chemical and mechanical properties of the membranes and adsorbents.

The components (d) are preferably derived for example from the following elements: Na, K, Mg, Ca, B, Al, Pb, P, As, Ti, Zr and/or V, where Na, Ca, Mg, B, Al and P are particularly preferred.

As non-volatile oxides, $Na_2O$, $K_2O$, $CaO$, $B_2O_3$, $As_2O_3$ and $P_2O_5$ are preferred.

Compounds forming non-volatile oxides which are soluble in the reaction medium are e.g. inorganic acids, such as phosphoric acid and boric acid, as well as their esters, halides and salts. Furthermore, metal hydroxides are suitable, such as NaOH, KOH or $Ca(OH)_2$, and metal alkoxides, such as NaOR, KOR, $Ca(OR)_2$, $Al(OR)_3$ or $Ti(OR)_4$, where R signifies a lower ($C_{1-6}$) alcohol, such as methanol, ethanol, propanol or butanol. Further usable starting compounds are metal salts of volatile acids, e.g. acetates, basic acetates, formates, nitrates and halides, such as basic lead acetate.

In preparing the membranes and adsorbents, the starting components are mixed in the desired quantities, with the exclusion of moisture, and if required are dissolved in an organic solvent. Examples of suitable solvents are alcohols, such as lower alcohols, such as methanol and ethanol, ketones, preferably lower dialkyl ketones such as acetone and methylisobutyl ketone, ethers, preferably lower dialkyl ethers such as diethylether, amides such as dimethylformamide and their mixtures.

Simultaneously or subsequently, at least that quantity of water is added which is stoichiometrically necessary for the hydrolytic cleavage of the hydrolysable groups present. The term "hydrolysable groups" means those groups which are hydrolysable under the reaction conditions employed, that is Si-O-alkyl, Si-H, Si-halogen, metal-O-alkyl and similar groups. Based upon alkoxy substituents, the stoichiometrical amount of water generally amounts to ⅔ of the quantity of water required for regular hydrolysis of all alkoxy radicals, since one water molecule is split off per two alkoxy radicals.

The polycondensation proceeds in the presence of a polycondensation catalyst, e.g. a proton or hydroxyl ion yielding compound or an amine. Examples of suitable catalysts are water, organic or inorganic acids, such as hydrochloric acid, nitric acid, sulphuric acid, phosphoric acid, formic acid, acetic acid, propionic acid and benzoic acid, as well as organic or inorganic bases, such as ammonia, alkali or alkaline earth metal hydroxides such as sodium, potassium or calcium hydroxide, and water-soluble amines, such as lower alkylamines, e.g. triethylamine. Water and water-soluble volatile acids and bases, particularly water, hydrochloric acid and ammonia, are especially preferred.

The catalyst is employed in an amount of up to 75% by weight, preferably up to 50% and most particularly up to 30% by weight. Preferably, at least about 3% by weight particularly at least 10% and most preferably at least 20% by weight of catalyst is used, based on the reaction mixture weight. Where water is used as the condensation catalyst, however, at least the amount of water necessary stoichiometrically for hydrolysis of the starting components is used. Where acids and bases are used as condensation catalysts, the above-mentioned amounts and concentrations are based on 0.1 N to 10 N aqueous solutions.

The polycondensation is generally carried out at a temperature from $-20°$ to $+130°$ C., preferably $0°$ to $65°$ C. and most particularly at room temperature. The condensation time depends upon the selected starting components and their proportions, the catalyst used, the reaction temperature and so on. With acid catalysts, shorter condensation times are employed.

The polycondensation is generally carried out in one stage up to complete condensation. In another embodiment, the starting components are precondensed in the presence of the catalyst and, if required a solvent, for 1 minute to 24 hours under the stated temperature conditions and are then finally fully condensed in the presence of at least the stoichiometric amount of water required for hydrolysis.

In general, precondensation is carried out to such an extent that the resultant precondensate still has a thin fluid consistency, that is up to a degree of polymerisation which corresponds to about 10 monomer units.

The polycondensation can be carried out at normal pressure, increased pressure or reduced pressure. If required, precondensation can be carried out with the exclusion of air, at the reflux temperature.

On completion of the condensation, the resultant gel can be carefully dehydrated and the solvent evaporated off. Drying preferably proceeds in an air current at room temperature. Finally, heat-treatment lasting, if required, for from several minutes up to several hours, preferably 15 minutes to 1 hour, is carried out at 100° to 160° C., most preferably at 110° to 130° C. During the drying step and the subsequent heat treatment, operation can be carried out if required under reduced pressure, e.g. under high vacuum.

The resultant silicic acid heteropolycondensates or membranes or adsorbents made from them can be subjected to treatment with water or steam. For example, water or steam can be allowed to act at 4° to 150° C., e.g. for 2 to 30 minutes. A 10 to 20 minute treatment with boiling water has been found particularly advantageous. Finally, the previously described heat treatment is then preferably carried out or repeated.

For making membranes, the silicic acid heteropolycondensates, produced for example in the form of compact blocks, can be very readily cut into thin layers, which can then be employed as membranes, either directly or after polishing. Another method consists in casting a solution of the silicic acid heteropolycondensate on a flat plate, e.g. of polyethylene, or on a mercury surface and allowing the solvent to evaporate. A thin membrane film then remains on the surface. If precondensates are used, in addition to the casting method, coating or spraying methods can also be used, for example.

The manufacture of asymmetric membranes proceeds for instance by casting an incompletely cross-linked precondensate, that is manufactured with a sub-stoichiometric amount of water, upon a water surface. A relatively finely-porous condensate skin, which is important for the separating effect of the membrane, then forms on the water surface, whereas the remaining silicic acid heteropolycondensate matrix formed after full condensation represents a relatively coarsely-porous supporting layer.

The silicic acid heteropolycondensate or precondensate can be drawn into fibres, hollow fibres, tubes or pipes or treated in other ways and employed in this form as membranes. Further methods for the manufacture of membranes are described by S. Hwang and K. Kammermeyer, "Techniques of Chemistry", Vol. VII, J. Wiley and Sons, New York (1975).

A special method for the manufacture of membranes, which likewise forms an aspect of the invention, consists in disposing a solution of the starting components in an organic solvent immiscible with water either:

(a) over an aqueous solution of the condensation catalyst, where the organic solvent has a lower specific gravity than the aqueous solution, or (b) under an aqueous solution of the condensation catalyst, where the organic solvent has a higher specific gravity than the aqueous solution, and then isolating the membrane produced at the phase interface.

Suitable organic solvents immiscible with water include e.g. aliphatic, cycloaliphatic, aromatic or aliphatic-aromatic hydrocarbons and halogenated hydrocarbons, such as petroleum ether, pentane, cyclohexane, benzene, toluene and carbontetrachloride, as well as ethers, such as diethylether and tetrahydrofuran.

The aqueous phase preferably consists of the condensation catalyst, e.g. water or an 0.1 N to 10 N aqueous solution of the aforementioned organic or inorganic acids or bases.

The conversion at the phase interface can be carried out at the aforementioned temperatures and in any case below the boiling point of the solvent used. If required, operation can be effected at elevated pressure. Preferably, formation of the membrane takes place at room temperature or at a slightly increased temperature, e.g. 40° to 50° C.

The membrane skin formed at the phase interface can be isolated for example, by allowing the upper phase to evaporate or if required by withdrawing it at increased temperature and/or under reduced pressure. The membrane then floats on the lower phase of higher specific gravity.

A further method is to use an additional lower phase, whereby the membrane is floated upwardly and can be isolated at the level of the rim of the reaction vessel. For this purpose, a three-phase system can also be used, where the lowermost phase consists of the most dense liquid, such as mercury or carbontetrachloride, and serves to receive the membrane left on the removal of the two lighter "reaction phases" proper, which facilitates its isolation from the reaction vessel.

If the membrane adheres sufficiently firmly to the wall of the reaction vessel, the lower phase can be withdrawn after evaporation or removal of the upper phase and the membrane can be dried in the stretched or clamped state.

Since starting components for forming the membrane are lost by diffusion into the aqueous catalyst phase, prefearbly lower silane concentrations are used in the organic phase and lesser layer thicknesses for the aqueous phase. By control of this diffusion process, asymmetrical membranes can also be obtained which have a coarsely-porous supporting layer on the side adjacent the aqueous phase and at the phase interface a relatively dense layer.

The membranes according to the invention exhibit thicknesses of 50 to 1000 $\mu$m, for example. They are therefore not self-supporting and must be supported in suitable ways, e.g. by porous or reticulated supporting materials such as glass, metal, plastics materials, ceramic materials or textile webs. The membranes are stretched on the supporting material, for example by means of a frame, and are sealed at the edges with silicone rubber or in some other way. Membranes of this kind can be suitably used for ultra-filtration at pressures from 1 to 50 bars.

If the silicic acid heteropolycondensates are produced in the condensation in granular form, they can be dried and, if required, then subjected to the aforedescribed treatment with water or steam and/or to a heat treatment and can then be used directly as adsorbents. Evidently, adsorbents formed in the usual way from compact condensation products can be used in granular or other forms. A special method of manufacture of suitable granulates consists in casting a still viscous precondensate into a suitable solvent, droplet formation thus taking place in this way. If required, the adsorbents according to the invention can be used in combination with conventional carrier materials and/or known adsorption agents.

The membranes and adsorbents of the invention are particularly suitable for the separation of materials in liquid and gaseous media, preferably liquid media and particularly aqueous media.

The membranes are generally suitable for the retention of ionic or molecular comounds, e.g. salts, acids, bases or large organic molecules. The separating effect depends on the one hand on the ratio of the effective pore diameters of the membrane to the diameter of the substance or compound to be retained and on the other hand on the functional groups of the silicic acid heteropolycondensate of the membrane. In accordance with the kind of substance to be retained, silicic acid heteropolycondensates are used which are made from silanes with hydrophilic or hydrophobic, acid or basic or other substituents. If a hydrophilic compound is to be retained, the starting silanes (b) and if required (c) preferably carry hydrophobic substituents e.g. aryl or aralkyl radicals. On the other hand, if a hydrophobic compound is to be retained, use is preferably made of starting silanes with hydrophilic substituents. e.g. hydroxy, ester or acid groups. In a particular embodiment, the membranes according to the invention can be used as ion exchange membranes, where either suitably substituted starting silanes are employed or the membranes are modified with derivative-producing agents in the ways described, so that they carry groups suitable for ion exchange e.g. tertiary or quanternary amino groups, phenolic hydroxyl groups or aliphatic or aromatic —$SO_3^-$ or —$COO^-$ groups.

The adsorbents of the invention are suitable for the purification of effluent waters, particularly for the separation of environmental pollutant materials, such as sulphuric acid, sulphonic acids, hydroxycarboxylic acids, chlorinated hydrocarbons, condensed aromatics, alcohols and phenols from dilute aqueous solutions. Furthermore, with their assistance, the products of chemical or biochemical synthesis methods can be isolated from reaction mixtures or product mixtures can be separated. The adsorption can be carried out continuously or discontinuously, e.g. in vessels or columns. A special advantage of the adsorbents according to the invention is that the substances to be adsorbed can be readily and inexpensively desorbed, e.g. with water, hot water, steam or dilute acids.

The membranes and adsorbents of the invention are generally characterised by a high temperature resistance. Depending upon the particular functional groups of the starting component (c), the silicic acid heteropolycondensates remain stable up to temperatures of 300° to 400° C. Furthermore, the membranes and adsorbents have marked resistance to water and organic solvents, so that they do not become modified as to pore sizes during the course of time, in contrast to the known cellulose acetate membranes. Also, the notable pressure resistance of the membranes and adsorbents of the invention has the result that the pores themselves do not become closed under high pressures, which makes them particularly suitable for use at high pressures for ultra-filtration.

In contrast to known surface-modified silica gels and porous glasses, the membranes and adsorbents of the invention are homogeneous products with statistically-distributed functional units. Even with mechanical wear of the surface during technical employment, the characteristic physical and chemical properties of the condensate surface are maintained, so that extended times of full retention of functionality are possible.

Because of their properties as multi-component systems, the silicic acid heteropolycondensates are particularly suited for adaptation to particular problem areas. By a suitable choice of starting components and their quantities, any desired combinations of properties can be achieved, e.g. in relation to chemical and thermal stability or mechanical and adsorption properties.

In this connection, it can be advantageous to modify the functional groups of the silicic acid heteropolycondensates or membranes or adsorbents manufactured from them, in accordance with the customary methods of organic chemistry. Depending upon the reactivity of the compounds or substances to be adsorbed or retained, the silicic acid heteropolycondensates can be converted to derivatives and/or can be coupled to other compounds. Suitable derivative-forming agents are e.g. amines, carboxylic acids, acid chlorides, thiocarbamates, thiocarbamic acid chloride, diazo compounds, esters and sulphides and so on. Modification of polycondensates containing $\gamma$-aminopropyl groups can be effected, for instance, by treating the polycondensate for 30 to 60 minutes at room temperature with an aqueous 2.5% glutaric aldehyde solution. The diazo derivative can be made, for example, by conversion with p-nitrobenzoyl chloride, reduction of the nitro group to the amine or diazotization with nitrous acid. If the silicic acid heteropolycondensate contains aniline groups already, through the use of a suitable functional silane, it can be immediately diazotized with nitrous acid. By conversion of the amino groups of the silicic acid heteropolycondensate with thiophosgene, isothiocyanate derivatives can be produced.

The following examples illustrate the invention. In the examples, specific surface is measured according to BET, the diameter of the small pores by the nitrogen adsorption isothermal and the diameter of the large pores by the SEM method.

EXAMPLES 1-6

MANUFACTURE OF ADSORBENTS

EXAMPLE 1

2.95 ml of tetramethoxysilane, 4.25 ml of dimethyldiethoxysilane, 7.30 ml of methanol and 2.31 ml of 6 N hydrochloric acid (approx. 17% by weight of catalyst) were combined at room temperature in the order given and allowed to stand for 20 days, with the exclusion of air. After drying for 16 hours in a drying tunnel at 120° C., a white granular product with a specific surface of 270 m$^2$/g was obtained. The coarse pores showed an average diameter of about 1 μm and the small pores an average diameter of about 2 to 5 nm.

EXAMPLE 2

122.00 ml of methanol, 48.00 ml of tetramethoxysilane, 68.50 ml of dimethyldiethoxysilane and 2.65 ml of γ-aminopropyltriethoxysilane were combined at room temperature in the order given. With cooling in a waterbath, 38.50 ml of 9 N hydrochloric acid was added dropwise (circa 17% by weight of catalyst) and the reaction mixture was left to stand. After setting, the vessel was filled with water to 500 ml, stirred and allowed to stand for 16 hours, air being excluded. The polycondensate obtained was then filtered off, washed with hot water at 80° C. and dried for 6 hours at 110° C. A light white powdery substance was obtained, having coarse pores of an average diameter of about 1 to 2 μm.

EXAMPLE 3

4.40 ml of tetramethoxysilane, 3.60 ml of methyltriethoxysilane, 8.00 ml of methanol and 3.10 ml of 1 N ammonia solution (circa 20% by weight of catalyst) were combined at room temperature in the order given and allowed to stand for 6 days, with the exclusion of air. After drying for 16 hours in a drying tunnel at 120° C., a white pulverulent substance was obtained with a specific surface of 550 m$^2$/g, whose coarse pores had an average diameter of about 1 to 2 μm.

EXAMPLE 4

5.90 ml of tetramethoxysilane, 1.80 ml of dimethyldiethoxysilane, 7.70 ml of methanol and 3.40 ml of 0.5 N hydrochloric acid (approximately 22% by weight of catalyst) were combined at room temperature in the order given and allowed to stand for 11 days, air being excluded. After drying for 16 hours in a drying tunnel at 120° C., a white hard product was obtained, having a specific surface of 130 m$^2$/g, with coarse pores having an average diameter of up to 1 μm.

MANUFACTURE OF MEMBRANES

EXAMPLE 5

5 ml of a 2 N hydrochloric acid solution (50% by weight of catalyst) was carefully layered with 5 ml of a silane solution (6.90 ml of dimethyldiethoxysilane and 5.90 ml of tetramethoxysilane in 170 ml of benzene) in a Petri dish. A skin formed at the phase interface. After 3 hours, the organic phase had evaporated and the membrane floating on the aqueous layer could be isolated.

EXAMPLE 6

5.70 ml of tetramethoxysilane and 6.90 ml of dimethyldiethoxysilane were dissolved in 20 ml of carbontetrachloride. 5 ml of this solution was layered with 5 ml of water, (50% by weight of catalyst) and allowed to stand for 40 hours. A thin translucent layer formed, which floated on the solution still present. After carefully withdrawing the liquid, a porous membrane was isolated which was usable for separation processes.

EXAMPLE OF USE

Decolourisation of a Textile Dyeing Liquor 25 g of the adsorbent according to Example 2 was introduced into a thermostatically-controllable glass column (2 cm internal diameter). From a supply container, a solution of a textile dye ("Teflon Light yellow T") preheated to approximately 80° C. was introduced at a velocity of 110 ml/min. The dye-stuff breakthrough occurred after approximately 3 liters of solution had run through. Under these conditions, the loading corresponded to 6 mg of dye-stuff per g of adsorbent.

We claim:

1. A process for the preparation of a porous heteropolycondensate adsorbent, comprising:
   (i) forming a reaction mixture comprising:
      (a) at least one hydrolysable silicic acid derivative of the general formula I:

$$SiR_4 \qquad (I)$$

wherein each R is selected from the group consisting of hydrogen, halogen, alkoxy and —NR'$_2$, wherein each R' is a hydrogen atom or an alkyl group, with the proviso that not all the R radicals are hydrogen atoms, and
      (b) at least one substituted silane of the general formula II:

$$SiR_nR''_{(4-n)} \qquad (II)$$

wherein R is as defined above, each R'' is selected from the group consisting of alkyl, alkenyl, aryl and aralkyl and n is an integer from 1 to 3, and
      (c) optionally at least one functional silane of the general formula III:

$$SiR_n(R'''Y)_{(4-n)} \qquad (III)$$

wherein R and n have the meanings defined above, each R''' is selected from the group consisting of alkylene, phenylene, alkylphenylene and alkylenephenylene and Y is selected from the group consisting of halogen, amino, anilino, aldehyde, keto, carboxy, hydroxy, mercapto, cyano, hydroxyphenyl, diazo, carboxylic alkyl ester, sulphonic acid (—SO₃H) and phosphoric acid (—PO₃H₂), and/or (d) optionally at least one oxide component selected from the group consisting of non-volatile oxides soluble in the reaction medium and compounds capable of forming non-volatile oxides soluble in the reaction medium, the oxide component being an oxide of an element selected from Groups Ia to Va, Group IVb and Group Vb of the Periodic System, the improvement which comprises:

(ii) subjecting the reaction mixture of hydrolysis and condensation in the presence of 10% to 75% by weight, based on the weight of the reaction mixture, of a condensation catalyst, with the proviso that when water is the condensation catalyst at least the amount of water stoichiometrically required for hydrolysis is used, optionally in the presence of a solvent, wherein the amounts of the components (a) to (d) are selected so that the resultant silicic acid heteropolycondensate, calculated as oxide units, contains, by weight, 35% to 90% of component (a), 10% to 50% of component (b), 0% to 15% of component (c) and 0% to 40% of component (d) and (iii) removing said water or solvent and drying the obtained polycondensate thereby obtaining a porous adsorbent having two definite different pore sizes including a smaller pore size in the nanometer range and a larger pore size in the micrometer range.

2. A method according to claim 1, wherein the reaction mixture is subjected to full condensation in one step and the resultant product is then dried.

3. A method according to claim 1, wherein a solution of the components of the reaction mixture is formed in an organic solvent immiscible with water, an aqueous solution of the condensation catalyst is formed, the respective solutions are disposed one above the other so as to define a phase interface therebetween and with the reaction mixture solution respectively above or below the condensation catalyst solution according to whether the organic solvent has a lower or higher specific gravity than the aqueous solution, and the desired membrane is isolated at the phase interface.

4. A method according to claim 3, wherein the water-immiscible solvent is selected from the group consisting of aliphatic, cycloaliphatic, aromatic and aliphatic-aromatic hydrocarbons and halogenated hydrocarbons and ethers.

5. A method according to claim 1, wherein the catalyst is used in an amount of 10% to 50% by weight, based on the weight of the reaction mixture.

6. A method according to claim 1, wherein the catalyst is used in an amount of 20% to 30% by weight, based on the weight of the reaction mixture.

7. A method according to claim 1, wherein the catalyst is selected from the group consisting of water and 0.1 N to 10 N aqueous solutions of organic and inorganic acids and organic and inorganic bases.

8. A method according to claim 1, wherein the resultant silicic acid heteropolycondensate is treated with water or steam.

9. A method according to claim 1, wherein the resultant silicic acid heteropolycondensate is subjected to treatment at an elevated temperature.

10. An article of manufacture in the form of a porous membrane or an adsorbent, comprising a silicic acid heteropolycondensate made by:

(i) forming a reaction mixture comprising:

(a) at least one hydrolysable silicic acid derivative of the general formula I:

$$SiR_4 \qquad (I)$$

wherein each R is selected from the group consisting of hydrogen, halogen, alkoxy and —NR'₂, wherein each R' is a hydrogen atom or an alkyl group, with the proviso that not all the R radicals are hydrogen atoms, and (b) at least one substituted silane of the general formula II:

$$SiR_nR''_{(4-n)} \qquad (II)$$

wherein R is as defined above, each R'' is selected from the group consisting of alkyl, alkenyl, aryl and aralkyl and n is an integer from 1 to 3, and (c) optionally at least one functional silane of the general formula III:

$$SiR_n(R'''Y)_{(4-n)} \qquad (III)$$

wherein R and n have the meanings defined above, each R''' is selected from the group consisting of alkylene, phenylene, alkylphenylene and alkylenephenylene and Y is selected from the group consisting of halogen, amino, anilino, aldehyde, keto, carboxy, hydroxy, mercapto, cyano, hydroxyphenyl, diazo, carboxylic alkyl ester, sulphonic acid (—SO₃H) and phosphoric acid (—PO₃H₂), and/or (d) optionally at least one oxide component selected from the group consisting of non-volatile oxides soluble in the reaction medium and compounds capable of forming non-volatile oxides soluble in the reaction medium, the oxide component being an oxide of an element selected from Groups Ia to Va, Group IVb and Group Vb of the Periodic System, (ii) subjecting the reaction mixture to hydrolysis and condensation in the presence of 10% to 75% by weight, based on the weight of the reaction mixture, of a condensation catalyst, with the proviso that when water is the condensation catalyst at least the amount of water stoichiometrically required for hydrolysis is used, optionally in the presence of a solvent, wherein the amounts of the components (a) to (d) are selected so that the resultant silicic acid heteropolycondensate, calculated as oxide units, contains, by weight, 35% to 90% of component (a), 10% to 50% of component (b), 0% to 15% of component (c) and 0% to 40% of component (d) and (iii) removing said water or solvent and drying the obtained polycondensate thereby obtaining a porous adsorbent having two definite different pore sizes including a smaller pore size in the nanometer range and a larger pore size in the micrometer range.

11. A porous adsorbent prepared by the process of claim 1, wherein said smaller pores have an average diameter of approximately 0.5 to 10 nanometers and said larger pores have an average diameter of approximately 0.1 to 10 micrometers.

12. A porous adsorbent prepared by the process of claim 1, having a three-dimensional structure including channels which represent said larger pores and spherical primary particles which contain said smaller pores.

13. A porous adsorbent according to claim 12, wherein said spherical primary particles which contain said smaller pores have a specific surface area of up to 1200 m²/g.

14. A porous adsorbent according to claim 12, wherein said spherical primary particles which contain said smaller pores have a specific surface area of 200 to 500 m²/g.

15. A porous silicic acid heteropolycondensate porous adsorbent having two definite different pore sizes including a smaller pore size in the nanometer range and a larger pore size in the micrometer range, comprising: a three-dimensional structure including channels having an average diameter of approximately 0.1 to 10 micrometers and spherical primary particles which contain smaller pores having an average diameter of 0.5 to 10 nanometers, said heteropolycondensate porous adsorbent being produced by a process comprising the steps of:

(i) forming a reaction mixture comprising:
(a) at least one hydrolysable silicic acid derivative of the general formula I:

$$SiR_4 \qquad (I)$$

wherein each R is selected from the group consisting of hydrogen, halogen, alkoxy and $-NR'_2$, wherein each R' is a hydrogen atom or an alkyl group, with the proviso that not all the R radicals are hydrogen atoms, and (b) at least one substituted silane of the general formula II:

$$SiR_n R''_{(4-n)} \qquad (II)$$

wherein R is as defined above, each R'' is selected from the group consisting of alkyl, alkenyl, aryl and aralkyl and n is an integer from 1 to 3, and (ii) subjecting the reaction mixture to hydrolysis and condensation in the presence of 10% to 75% by weight, based on the weight of the reaction mixture, of a condensation catalyst, with the proviso that when water is the condensation catalyst at least the amount of water stoichiometrically required for hydrolysis is used, optionally in the presence of a solvent, wherein the amounts of components (a) and (b) are selected so that the resultant silicic acid heteropolycondensate, calculated as oxide units, contains, by weight, 35% to 90% of component (a) and 10% to 50% of component (b) and (iii) removing the water or solvent from the obtained polycondensate to obtain a porous adsorbent.

16. A porous adsorbent according to claim 15, wherein said reaction mixture further includes:
(c) at least one functional silane of the general formula III:

$$SiR_n(R'''Y)_{(4-n)} \qquad (III)$$

wherein R and n have the meanings defined above, each R''' is selected from the group consisting of alkylene, phenylene, alkylphenylene and alkylenephenylene and Y is selected from the group consisting of halogen, amino, anilino, aldehyde, keto, carboxy, hydroxy, mercapto, cyano, hydroxyphenyl, diazo, carboxylic alkyl ester, sulphonic acid ($-SO_3H$) and phosphoric acid ($-PO_3H_2$).

17. A porous adsorbent according to claim 15, wherein said reaction mixture further includes:
(d) at least one oxide component selected from the group consisting of non-volatile oxides soluble in the reaction medium and compounds capable of forming non-volatile oxides soluble in the reaction medium, the oxide component being an oxide of an element selected from Groups Ia to Va, Group IVb and Group Vb of the Periodic System.

18. A porous adsorbent according to claim 15, wherein the catalyst is used in an amount of 10% to 50% by weight based on the weight of the reaction mixture.

19. A porous adsorbent according to claim 15, wherein the catalyst is used in an amount of 20% to 30% by weight based on the weight of the reaction mixture.

20. A porous adsorbent according to claim 15, 18 or 19 in the form of a membrane.

21. A porous adsorbent according to claim 15, 18 or 19 in granular form.

22. A method according to claim 1, wherein said condensation catalyst is water.

* * * * *